(12) United States Patent
Grassi

(10) Patent No.: US 12,523,832 B2
(45) Date of Patent: Jan. 13, 2026

(54) SUBMARINE OPTICAL AMPLIFIER FOR OPTICAL TELECOMMUNICATION SYSTEMS AND RELATED PRODUCTION PROCESS

(71) Applicant: SUBPHOTON S.R.L., Cernusco sul Naviglio (IT)

(72) Inventor: Sergio Walter Grassi, Cernusco sul Naviglio (IT)

(73) Assignee: SUBPHOTON S.R.L.

( * ) Notice: Subject to any disclaimer, the term of this patent is extended or adjusted under 35 U.S.C. 154(b) by 923 days.

(21) Appl. No.: 17/774,859

(22) PCT Filed: Nov. 9, 2020

(86) PCT No.: PCT/IT2020/050271
§ 371 (c)(1),
(2) Date: May 6, 2022

(87) PCT Pub. No.: WO2021/095073
PCT Pub. Date: May 20, 2021

(65) Prior Publication Data
US 2022/0390696 A1 Dec. 8, 2022

(30) Foreign Application Priority Data
Nov. 12, 2019 (IT) .................. 102019000020913

(51) Int. Cl.
*G02B 6/44* (2006.01)
*H01S 3/067* (2006.01)

(52) U.S. Cl.
CPC ........ *G02B 6/4427* (2013.01); *H01S 3/06704* (2013.01)

(58) Field of Classification Search
None
See application file for complete search history.

(56) References Cited

U.S. PATENT DOCUMENTS 4,253,729 A   3/1981  Rocton
2005/0200943 A1*  9/2005  DeVincentis ........ G02B 6/4471
                                              359/333

FOREIGN PATENT DOCUMENTS

CN   106782798 A   5/2017
CN   109318450 A   2/2019
CN   110350451 A   10/2019

OTHER PUBLICATIONS

Polyether ether ketone, Apr. 4, 2017, Wikipedia.
(Continued)

*Primary Examiner* — Eric L Bolda

(57) ABSTRACT

Production process of a submarine optical amplifier (99) for optical telecommunication systems, and relative submarine optical amplifier (99), comprising:
  covering at least a central body (3) for making a central portion (6) of a layer of electrically insulating material (60) which covers a vessel (50);
  inserting an apparatus for optical amplification (5) at least partially in an housing cavity (4) of the vessel (50);
  assembling the vessel (50) by fixing at least a first end body (1) to the central body (3) for closing said housing cavity (4);
  completing the electrically insulating material (60) by at least partially covering the first end body (1) with the electrically insulating material for making a first portion (6') of the layer of electrically insulating material (60), wherein a first thermally insulating element (7) is interposed between the central body (3) and the first portion (6') of the layer of electrically insulating material (60).

12 Claims, 6 Drawing Sheets

(56) References Cited

OTHER PUBLICATIONS

PEEK finished parts, Jul. 15, 2019, www.bieglo.com.
Written Opinion of the ISA, Feb. 3, 2021.
Yuji Nagai et al, Thermal Conductivity of Epoxy Resin Filled with Particulate Aluminum Nitride Powder, Journal of the Ceramic Society of Japan, Jan. 1, 1997 (Jan. 1, 1997), pp. 197-200, vol. 105, No. 1219, Japan, ISSN: 0914-5400, DOI: 10.2109/jcersj.105.197.

* cited by examiner

SUBMARINE OPTICAL AMPLIFIER FOR OPTICAL TELECOMMUNICATION SYSTEMS AND RELATED PRODUCTION PROCESS

TECHNICAL FIELD OF THE INVENTION

The present invention relates to a submarine optical amplifier for optical telecommunication systems and a production process of the submarine optical amplifier.

STATE OF THE ART

Submarine amplified optical telecommunication systems are used for the transmission of optical signals between two stations placed at very long distance from each other (e.g. 2000-8000 km). Such optical telecommunication systems typically comprise an optical telecommunication line which connects the two stations and which comprises a submarine optical transmission cable along which a plurality of submarine optical amplifiers, arranged at predetermined distances (e.g. 50-80 km) from each other, is distributed. Each amplifier is coupled to the optical transmission cable by means of at least two pieces of optical cable. Such pieces of optical cable can be two or more portions of the optical transmission cable directly coupled to the amplifier, or two or more suitable connection cables (called in jargon 'pigtails') between amplifier and respective junction boxes (called in jargon 'couplers'), which are in turn coupled to the optical transmission cable. Typically, the optical transmission cable comprises a plurality of fibres pairs and an electric conductor for the powering of typically high voltage (e.g. 10-15 kV) continuous current. The optical transmission cables typically have a structure comprising, from a radially innermost position to an outermost one, the optical fibres for the information transmission, a protective coating for the optical fibres, a structure made of steel cables which is pressure-resistant for avoiding damages of the fibres due to the high-pressures (e.g. 800 bar) present at the laying depth of the cables (e.g. up to about 8000 m), an electric conducting tube (e.g. made of copper) for the continuous passage of current, and an electrically insulating sheath (typically made of polyethylene) for ensuring high voltage electric insulation (i.e. the operating voltage of the optical telecommunication line).

Typically, a submarine optical amplifier for optical telecommunication systems comprises a hollow metallic vessel (typically made of steel) comprising a cylindrical central portion which delimits a housing cavity and two (typically hollow) caps placed at the two opposite ends of the central portion of the vessel. Inside the housing cavity the apparatus for optical amplification is positioned (i.e. the set of electric, electronic, optical and opto-electronic components) for the processing (e.g. the amplification and/or the regeneration and/or the routing and/or the filtering) of the optical signal. The term 'optical amplifier' is therefore not to be meant as restricted to optical amplification only, but comprises any operation performed on the optical signal by current-powered opto-electronic components ('active components').

To obtain an efficient and effective functioning and/or the safety of the optical telecommunication system, it is necessary making a high voltage electric insulation at also for the optical amplifier (in particular for the apparatus for optical amplification contained inside the housing cavity). For the making of this electric insulation it is known using two different structure types of the optical amplifier itself:

internal insulation optical amplifier, wherein the hollow vessel is kept at the sea electric voltage (i.e. at mass). The electric conductor of the cable enters in and exits from the vessel at the caps through a respective passing element able to simultaneously perform the function of high voltage electric insulation (between conductor and vessel) and of high-pressure hydraulic seal. The active components of the apparatus for optical amplification inside the vessel are therefore kept at high voltage with respect to the vessel, and typically an electrically insulating material (e.g. ceramic material) must be interposed between the vessel and the active components, which ensures both electric insulation and a good dissipation, towards the outside, of the heat developed by the active components during their operation (for keeping the temperature of the active components within acceptable limits). This type of structure entails constraints on the arrangement of the components of the apparatus for optical amplification because it is necessary that appropriate distances between the high voltage elements and the sea voltage elements of the amplifier are respected. These spatial constraints entail inner volumes of the amplifier not available for the active components, but at the most for the electrically insulating material, with a consequent reduction in the exploitation efficiency of the inner volume of the amplifier. Such reduction in the exploitation efficiency worsens as the voltage of the system increases and its impact on the increase of the amplifier overall encumbrance increases as the number of fiber pairs increases.

external insulation optical amplifier, wherein the hollow vessel is kept at high voltage (i.e. the same powering voltage of the telecommunication system). In this case the high voltage electric insulation is made externally to the vessel by an electrically insulating covering layer (typically made of polyethylene) which continuously joins the electrically insulating external sheaths of the two (or more) pieces of cable coupled to the optical amplifier. In this way, the passing elements, which allow the entry and the exit of the electric conductor and of the fibres into/from the container through the caps, perform, typically in addition to the function of high-pressure hydraulic seal, the function of low voltage electric insulation, i.e. corresponding to the potential drop (typically on the order of 100 V) necessary for the operation of the apparatus for optical amplification. Therefore, inside the amplifier it is sufficient to ensure an electric insulation sized on the aforesaid very low potential drop (when compared to the high voltage above). It follows that no high distances are required as in the previous case of internal insulation, thus allowing to maintain low the encumbrance of the optical amplifier (even for a high number of fiber pairs). Moreover, the electrically insulating covering layer present on the optical amplifier allows an efficient dissipation, towards the sea, of the heat generated by the operation of the active components of the apparatus for optical amplification, avoiding excessive temperature rises inside the housing cavity that could cause a damage of the components of the apparatus for optical amplification. The heat dissipation is facilitated by the large exchange surface and by the intimate contact at the interface between the covering layer and the vessel, as ensured by the water pressure.

SUMMARY OF THE INVENTION

In the context of the external insulation submarine optical amplifiers, the Applicant has made the following considerations.

To obtain an external high voltage electric insulation having the desired properties it is desirable that the following requirements are met:

- perfect microstructural continuity between the external electrically insulating covering layer of the optical amplifier and the electrically insulating sheaths of the two or more pieces of optical cable coupled to the optical amplifier, so as to avoid the formation of defects that would compromise the high voltage insulation;
- absence of defects and/or voids and/or cracks in the structure of the electrically insulating covering layer, which could affect the electric insulation of the optical amplifier.

The Applicant has therefore realized that for obtaining the perfect continuity between the electrically insulating covering layer of the optical amplifier and the electrically insulating sheaths of the pieces of optical cable, it is necessary that covering layer and sheaths are made of the same material (typically polyethylene), and that the junction between covering layer and sheaths of the cables is made reaching the melting temperature of the material (for example equal to about 120-150° C. for polyethylene) so as to obtain a perfect amalgam between covering layer and sheaths.

The Applicant has also found that the application of the electrically insulating covering layer takes place on the vessel already closed and containing the apparatus for optical amplification. Therefore, the high melting temperature of the material that makes the covering layer and the electrically insulating sheaths tends to cause a temperature increase inside the housing cavity, with the consequent risk of damaging the apparatus for optical amplification.

To overcome this drawback, for example, a possible technique for the making of the electrically insulating covering layer of the optical amplifier is high-pressure injection moulding, wherein the very short injection times (e.g. in the order of one minute) and the relatively cold mould prevent a temperature increase inside the housing cavity such as to cause damages to the apparatus for optical amplification. The limited temperature increase inside the housing cavity is possible thanks also to the high thermal inertia of the hollow vessel which acts as heat shield for the components of the apparatus for optical amplification.

In the high-pressure injection moulding, the fluidity of the material that makes the covering layer is given by the injection temperature (i.e. the melting temperature of the material) and by the temperature rise due to the combination of viscous forces and high flow velocity (i.e. viscous friction between the fluid layers).

According to the Applicant, all this entails a high flow control difficulty and therefore a high risk that filling defects and/or imperfections (voids, cracks, etc.) and/or inclusions of air bubbles are formed in the electrically insulating covering layer, which can affect the electric insulation.

Furthermore, in the high-pressure injection moulding, to ensure such rapid process times, it is necessary using high injection pressures that require bulky and/or heavy and/or expensive and/or complex to be used injection machinery and mould closing machinery.

The Applicant has therefore faced the problem of producing a submarine optical amplifier comprising a fully functional and performing electrically insulating external covering layer (e.g. free of structural defects and/or imperfections and/or inclusions of air bubbles), using not bulky and/or not expensive processes and machinery (without prejudicing the need to avoid harmful overheating of the apparatus for optical amplification in the vessel during the making of the coating layer) for the making of the covering layer.

According to an aspect the invention relates to a submarine optical amplifier for optical telecommunication systems.

Preferably said submarine optical amplifier comprises:
- a vessel comprising a central body, having a housing cavity, and a first and a second end body at respectively a first and a second end of said central body, (longitudinally) opposite to each other, for closing said housing cavity;
- an apparatus for optical amplification at least partially (typically entirely) housed in said housing cavity;
- a layer of electrically insulating material which externally, entirely and with continuity covers said vessel.

Preferably said submarine optical amplifier comprises at least a first thermally insulating element interposed between said central body and a first portion of said layer of electrically insulating material which at least partially covers said first end body.

According to an aspect the invention relates to a production process of a submarine optical amplifier for optical telecommunication systems comprising a vessel, comprising a central body, having a housing cavity, and a first and a second end body, and a layer of electrically insulating material which externally, entirely and with continuity covers said vessel.

Preferably the process comprises:
- covering in part said vessel with said electrically insulating material for making a part of said layer of electrically insulating material comprising at least a central portion of said layer of electrically insulating material which covers said central body;
- subsequently to said covering in part said vessel, inserting an apparatus for optical amplification at least partially in said housing cavity;
- subsequently to said inserting, assembling said vessel by fixing at least said first end body to said central body at a first end of said central body for closing said housing cavity, wherein at least a first thermally insulating element is coupled to said first end body;
- subsequently to said assembling, at least partially covering said first end body with said electrically insulating material for making a first portion of the layer of electrically insulating material, which forms, together with said part of said layer of electrically insulating material, said layer of electrically insulating material.

Preferably said first thermally insulating element is interposed between said central body and said first portion of the layer of electrically insulating material.

According to an aspect the invention relates to an optical communication line comprising an optical transmission cable and at least one submarine optical amplifier (typically a plurality of submarine optical amplifiers) according to the present invention coupled to the optical transmission cable. Preferably the optical communication line comprises at least two pieces of optical cable coupled on one side with said submarine optical amplifier, respectively at said first and said second end body, and on the other side with said optical transmission cable.

With the expressions "layer of electrically insulating material which entirely and with continuity covers said vessel" or "covering in part said vessel with said electrically insulating material" and the like, the coupling zones of the submarine optical amplifier with the two or more pieces of optical cable are neglected, wherein the vessel has through openings and wherein the layer of electrically insulating material typically continuously melts with the sheaths of the pieces of optical cable.

With the term "externally" and the like, a position distal from the housing cavity (i.e. inside the vessel) is meant. For example, with the expression "a first element is placed externally to a second element" it is meant that the first element is in a position more distal from the housing cavity than the position of the second element.

According to the Applicant, the first thermally insulating element interposed between the central body and a first portion of the layer of electrically insulating material which at least partially covers the first end body, allows thermally insulating the central body from such portion of the layer of electrically insulating material. For example, the thermally insulating element intercepts any continuous thermal path by conduction (i.e. excluding the heat exchange by radiation and by convection) which originates from the portion of the layer of material that at least partially covers the first end body, passes through the first end body and ends in the central body.

According to the Applicant, this thermally insulating element advantageously allows making the first portion of the layer of electrically insulating material by a hot-mould moulding process. In this process, the first end body, already fixed to the central body and still without the layer of electrically insulating material, is closed in a mould which is pre-heated up to the melting temperature of the electrically insulating material. The making of the first portion of the layer of electrically insulating material takes place operating a slow (e.g. times of 10-30 minutes) and accurate filling of the mould with the material kept in the molten state. In this way, a high control of the flows is ensured and the formation of filling defects and/or imperfections and/or inclusions of air bubbles described above is limited or avoided, giving to the layer of electrically insulating material full functionality and optimal performances. The hot mould moulding process allows the use of not bulky and/or not expensive machinery, since no high mechanical and/or hydraulic pressures are required, unlike the traditional high-pressure injection moulding process.

The thermally insulating element, during the hot mould moulding process, acts as heat shield between the portion of the layer of material that is being made (arbitrarily denoted as 'the first portion') and the central body, preventing that an excessive rise of the temperature of the central body occurs and consequently of the temperature of the housing cavity. In this way, damages to the apparatus for optical amplification (in particular the lasers) are avoided, which typically is already inserted inside the housing cavity before the moulding of the first portion of the layer of electrically insulating material (which is the portion that completes such layer of electrically insulating material).

The present invention in one or more of the aforesaid aspects can have one or more of the following preferred features.

Typically, the submarine optical amplifier has a longitudinal development direction (which is typically the main one).

Preferably said vessel has a cylindrical symmetry about a longitudinal axis.

Preferably said central body is (substantially) cylindrical.

Preferably at least a part of said first and/or said second end body has cap shape, more preferably spherical cap shape.

In this way the vessel efficiently withstands the operating pressures.

In one embodiment a further part of said first and/or said second end body, proximal to said central body, has cylindrical shape. In this way the fixing between the central body and the end bodies is simplified.

In one embodiment said second end body is in single piece with said central body.

In this way a simple structure of the vessel is obtained and also the production process is simplified, as better explained below.

In one embodiment said covering in part said vessel comprises covering also said second end body with said electrically insulating material (in other words said part of the layer of electrically insulating material comprises also a covering of the second end body). Such covering, which is performed before the insertion of the apparatus for optical amplification, can be advantageously heat performed (simplifying the subsequent step of completing the covering with the apparatus for optical amplification inserted in the vessel).

In one embodiment said second end body is distinct from said central body. In this way the insertion of the apparatus for optical amplification inside the housing cavity is simplified, since the central body is accessible from both its ends.

Preferably said assembling said vessel comprises fixing said second end body to said central body at a second end of said central body, (longitudinally) opposite to the first end, for closing said housing cavity, wherein a second thermally insulating element is coupled to said second end body.

Preferably said first (and preferably said second) end body is fixed to the central body, more preferably through fixing means (e.g. screws, bolts).

In this way it is possible easily and/or safely fixing the first and/or the second end body to the central body.

Preferably said submarine optical amplifier comprises a second thermally insulating element interposed between said central body and a second portion of said layer of electrically insulating material which at least partially covers said second end body.

Preferably (subsequently to said assembling) it is provided at least partially covering said second end body with said electrically insulating material, for making a second portion of the layer of electrically insulating material, which forms, together with said central portion of said layer of electrically insulating material and said first portion of the layer of electrically insulating material, said layer of electrically insulating material. Preferably said second thermally insulating element is interposed between said central body and said second portion of the layer of electrically insulating material.

In this way it is possible ensuring the thermal insulation also at the second end body, with the above described advantages.

Preferably said covering sin part said vessel and/or at least partially covering said first (and/or second) end body comprises filling a mould with said electrically insulating material in molten state.

Preferably said mould is maintained (and preferably heated prior to the filling) at a temperature greater than or equal to a melting temperature of said electrically insulating material. In this way, it is possible easily maintaining the material in molten state during the whole making of the respective portion of the layer of electrically insulating material, allowing an accurate and simple making of the layer of electrically insulating material (e.g. with low injection pressure).

Preferably said filling said mould occurs in a time interval greater than or equal to 10 minutes, more preferably greater than or equal to 20 minutes. In this way it is possible accurately making the respective portion of the layer of electrically insulating material, having a compact and continuous structure.

Preferably said at least partially covering said first (and/or second) end body comprises, subsequently to said filling said mould with said electrically insulating material, letting cooling said electrically insulating material for a time interval greater than or equal to 60 minutes, more preferably greater than or equal to 80 minutes. The slow cooling favours the correct solidification of the layer of electrically insulating material in making, avoiding the formation of structural imperfections, for example due to material internal stresses, such as to compromise the electrically insulating features of the layer of electrically insulating material.

Preferably said at least partially covering said first (and/or second) end body comprises, during said filling said mould with said electrically insulating material, cooling said central body (more preferably at an external surface of said central portion of electrically insulating material). In this way, during the making of the first and/or of the second portion of layer of electrically insulating material, the temperature increase inside the housing cavity due to the moulding process of the first and/or of the second portion of layer of electrically insulating material is efficiently limited.

In one embodiment said at least partially covering said second end body is performed together with said at least partially covering said first end body. In this way the production process of the submarine optical amplifier is simplified and/or speeded up.

In one embodiment said at least partially covering said second end body is performed at a temporarily different moment (e.g. subsequently) from said at least partially covering said first end body. In this way the same equipment can be used (e.g. mould, press and injection systems, etc.) for the making of both the first and the second portion of the layer of electrically insulating material, reducing the costs of the production process of the submarine optical amplifier (albeit in face of an increase of the required times). Furthermore, covering the two end bodies at temporarily different moments allows to limit the temperature increase inside the housing cavity since the heat flow reaches the central body only from one of the two end bodies at a time.

In one embodiment said first (and preferably said second) thermally insulating element comprises (or consist of) a ring interposed between said central body and said first (and preferably respectively said second) end body.

In one embodiment said first (and preferably said second) thermally insulating element entirely and with continuity covers (e.g. except for through openings of the end body for the housing of the passing elements) an external surface of the first (and preferably respectively said second) end body.

Preferably said central portion of said layer of electrically insulating material comprises a (longitudinally) protruding portion from said central body at least at said first end of said central body (and preferably also at the second end of the central body). Preferably said protruding portion is, when the vessel is assembled, externally to at least a part of said first (and preferably of said second) thermally insulating element.

Preferably said at least partially covering said first (and/or second) end body comprises melting together a respective end of said protruding portion and a respective end of said first (and/or respectively of said second) portion of the layer of electrically insulating material.

In this way, it is possible entirely covering the first (and/or the second) end body so as to ensure the continuity of the layer of electrically insulating material along all the development of the submarine optical amplifier (except for the coupling zones with the pieces of cable).

Preferably said assembling said vessel is performed subsequently to have coupled said first (and preferably said second) thermally insulating element to said first (and preferably respectively to said second) end body.

Preferably said vessel is made of metal, more preferably steel. Preferably said vessel has a thickness greater than or equal to 20 mm, and/or less than or equal to 50 mm.

According to the Applicant, these materials and this preferred range of thickness values, favour both the protection of the apparatus for optical amplification from the high-pressure present at the laying depth, and a thermal inertia suitable to keep the temperature inside the housing cavity substantially homogenous during the operation of the submarine optical amplifier.

Preferably said first (and/or said second) thermally insulating element is made of a material having a thermal conductivity less than or equal to 0.50 W/(m·K), more preferably less than or equal to 0.40 W/(m·K), even more preferably less than or equal to 0.30 W/(m·K).

In this way it is possible achieving the desired thermal insulation between the central body and the first (and/or the second) portion of the layer of electrically insulating material.

Preferably said electrically insulating material has a thermal conductivity greater than or equal to 0.20 W/(m·K), more preferably greater than or equal to 0.40 W/(m·K). In this way, it is possible to create a path with lower thermal resistance at any portion of the submarine optical amplifier in which the first (and/or the second) thermally insulating element is not present. In fact, through the direct contact between the external surface of the central body and the portion of layer of electrically insulating material which covers it, it is possible dissipating the heat generated during the operation of the apparatus for optical amplification, helping keeping the temperature inside the housing cavity in a value range such as not to cause damages to the apparatus for optical amplification.

Preferably said first (and/or said second) thermally insulating element is made of poly-aryl-ether-ketone (PAEK), more preferably of poly-ether-ether-ketone (PEEK) and/or of poly-ether-ketone-ketone (PAEK).

In one embodiment said first (and/or said second) thermally insulating element is made of ceramic material, more preferably alumina (aluminium oxide) and/or zirconia (zirconium oxide).

Preferably said first (and/or said second) thermally insulating element has a (more preferably constant) thickness greater than or equal to 2 mm, and/or less than or equal to 10 mm.

According to the Applicant, this type of materials and this thickness range ensure the desired thermal insulation properties to the first (and/or to the second) thermal insulating element.

Preferably said first (and/or said second) thermally insulating element is made of a material having a melting temperature greater than or equal to 250° C., more preferably greater than or equal to 280° C., even more preferably greater than or equal to 320° C. In this way, the first (and/or the second) thermally insulating element does not undergo physical state changes due to the temperatures and/or to the long times of the production process of the first (and/or respectively of the second) portion of layer of electrically insulating material.

Preferably said electrically insulating material has an electric resistivity greater than or equal to 1013 Ω/m, more preferably greater than or equal to 1014 Ω/m, even more preferably greater than or equal to 1015 Ω/m.

Preferably said electrically insulating material is polyethylene (PE), more preferably high-density polyethylene (HDPE).

Preferably said electrically insulating material has a dielectric rigidity greater than or equal to 50 kV/mm. In this way, it is possible conferring reliability to the electric insulation during the whole operational life of the submarine optical amplifier.

Preferably said layer of electrically insulating material has a (more preferably constant) thickness greater than or equal to 3 mm, and/or less than or equal to 9 mm.

According to the Applicant this type of materials and such thickness range ensure the desired electric insulation properties to the layer of electrically insulating material, even in presence of possible engravings which can happen during all the production steps subsequent to the moulding.

In one embodiment said submarine optical amplifier comprises an electrically conductive or semi-conductive first screen (and preferably a second screen), which externally, entirely and with continuity covers (e.g. except for through openings for the housing of the passing elements) said first (and preferably respectively said second) thermally insulating element.

Preferably said first (and preferably said second) screen is interposed between (more preferably in contact with) said layer of electrically insulating material and said first (and preferably respectively said second) thermally insulating element.

According to the Applicant, the presence of a respective screen at the external surface of the thermally insulating elements allows a better distribution of the electric field which develops inside the layer of electrically insulating material that covers the respective end body, since an element having better electric properties than the thermally insulating element is introduced. In fact, electric field concentration could be generated which could, especially on long term, bring to a damage (e.g. perforation) of the layer of electrically insulating material.

Preferably subsequently to said assembling said vessel, it is provided coupling to said first (and preferably to said second) thermally insulating element an electrically conductive or semi-conductive first screen (and preferably respectively a second screen). Preferably said coupling said first (and preferably said second) screen is performed previously to said at least partially covering said first (and preferably said second) end body.

In this way the production process of the submarine optical amplifier is simplified.

Preferably said first (and/or said second) screen has a thickness greater than or equal to 1 mm, and/or less than or equal to 4 mm.

Preferably said first (and/or said second) screen is made of metal, more preferably with a same material that makes said vessel, even more preferably it is made of steel.

In this way, it is possible to ensure the desired management properties of the electric field of the first (and/or of the second) screen, while limiting the alteration (e.g. step-like shaped) of the regularity of the external surface.

In one embodiment said first (and/or said second) screen is made of polymeric material, preferably poly-aryl-ether-ketone (PAEK), filled with a filler (e.g. graphite and/or carbon fibres) for making said polymeric material electrically semi-conductive.

In one embodiment said first (and preferably said second) thermally insulating element is made of poly-tetra-fluor-ethylene (PTFE). Such material is particularly advantageous in presence of the first (and/or second) screen, since the screen confers the desired mechanical properties to the external surface (which are not ensured by the PTFE, for example since it is mechanically too soft).

Preferably a set of said vessel and said first (and preferably said second) thermally insulating element (and preferably said first and more preferably said second screen) has a regular external surface, i.e. it has no jump discontinuity (e.g. abrupt depressions and/or ridges). In this way, the inner surface (i.e. nearer to the housing cavity) of the layer of electrically insulating material faces a surface without abrupt discontinuity. This allows having a layer of electrically insulating material with constant thickness, avoiding generating stresses inside the layer of electrically insulating material which could affect the electric insulation of the submarine optical amplifier once laid.

Preferably said pieces of optical cable comprises an electrically insulating external sheath made of electrically insulating material. Preferably said at least partially covering said first (and/or said second) end body comprises melting together said sheath of a respective piece of cable and a respective end of said first (and/or respectively of said second) portion of the layer of electrically insulating material. In this way the sheath and the electrically insulating layer are intimately amalgamated for ensuring micro-structural continuity between the two elements.

Preferably said second thermally insulating material has at least one of, more preferably all, the features described for said first thermally insulating element.

DETAILED DESCRIPTION OF SOME EMBODIMENTS OF THE INVENTION

Figure 1:
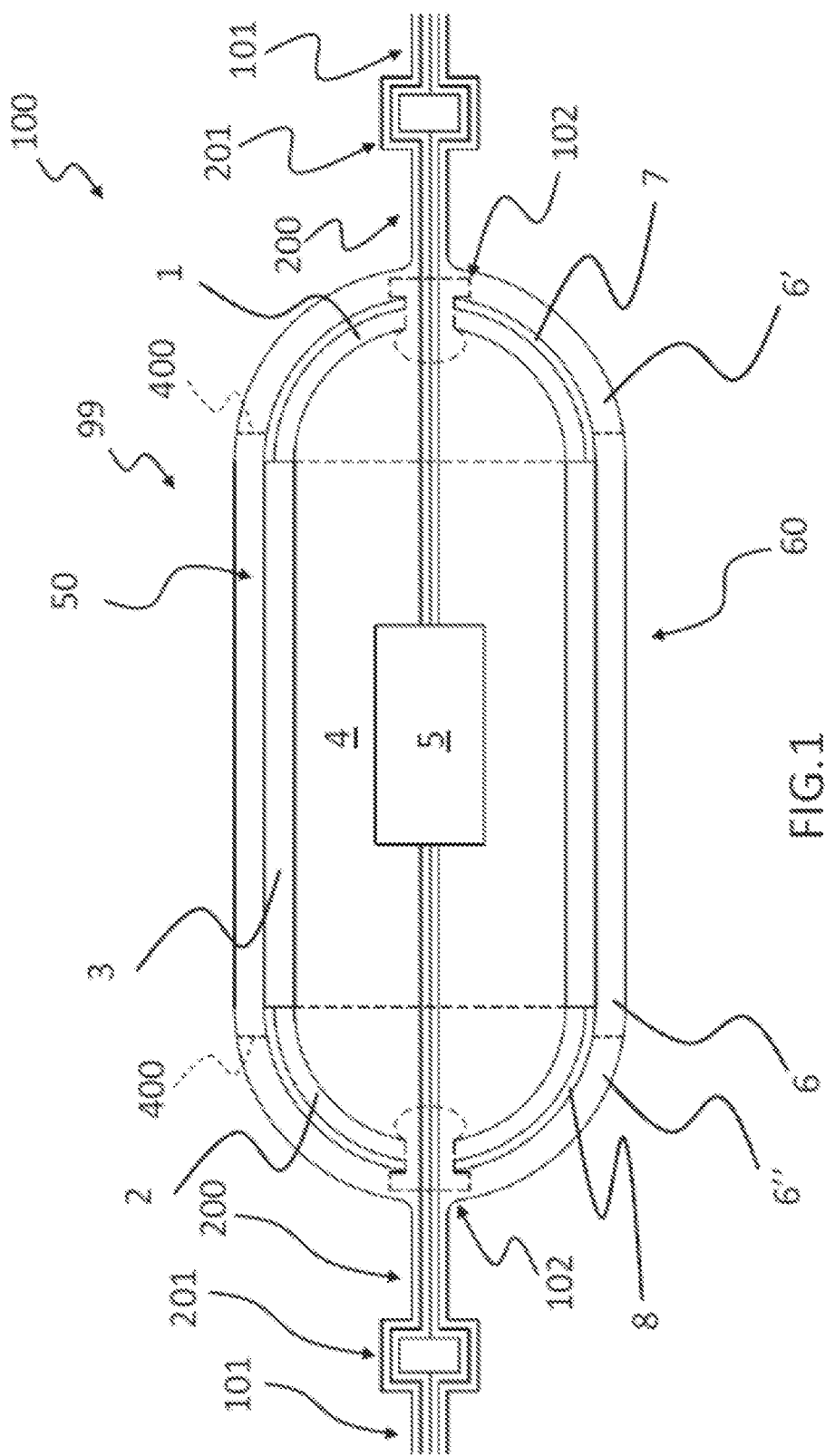
FIG. 1 schematically shows a longitudinal sectional view of a submarine optical amplifier according to an embodiment of the present invention.

The features and the advantages of the present invention will be further clarified by the following detailed description of some embodiments of the present invention, presented by way of non-limiting example, with reference to the attached figures. Where appropriate, the same reference numbers are used for the same elements, even in their construction variants.

The submarine optical amplifier 99 typically has a main development direction 300 (shown only in FIG. 2a), conventionally defined as "longitudinal direction".

Preferably the submarine optical amplifier 99 comprises:
a vessel 50 comprising a central body 3 having a housing cavity 4 and a first 1 and a second end body 2 respectively at a first and a second ends of the central body 3, longitudinally opposite to each other, for closing the housing cavity 4;
an apparatus for optical amplification 5 housed in the housing cavity 4;
a layer of electrically insulating material 60 which externally, entirely and continuously covers the container 50.

Preferably the submarine optical amplifier 99 comprises a first thermally insulating element 7 interposed between the central body 3 and a first portion 6' of the layer of electrically insulating material 60 which at least partially covers the first end body 1.

Preferably, as in the examples shown in FIGS. 1, 2a, 2b, 4 and 5, the submarine optical amplifier 99 comprises a second thermally insulating element 8 interposed between the central body 3 and a second portion 6" of the layer of electrically insulating material 60 which at least partially covers the second end body 2.

Typically, the structure of the submarine optical amplifier (except for the apparatus for optical amplification 5) has a symmetry plane perpendicular to the longitudinal direction and a cylindrical symmetry with respect to a longitudinal axis (substantially coincident with the longitudinal direction 300).

In use, the submarine optical amplifier 99 is inserted along an optical telecommunication line 100 (shown only in part in FIG. 1) comprising an optical transmission cable 101 coupled to the submarine optical amplifier 99 by means of two or more pieces of optical cable 200. Exemplarily (as shown in FIG. 1) the pieces of cable are suitable connection cables (e.g. "pig-tails") coupled on one side to the submarine optical amplifier 99 respectively at the first 1 and the second end body 2, and on the other side, exemplarily through a respective junction box 201 (called "coupler"), to the optical transmission cable 101.

In one alternative (not shown) embodiment the optical transmission cable 101 is directly coupled to the submarine optical amplifier 99 at the first 1 and the second end body 2, therefore without the need of providing the suitable connection cables and the junction box.

To allow the passage of the pieces of cable 200 inside the submarine optical amplifier 99, the first 1 and the second end body 2, as well as the first 7 and the second thermally insulating element 8, are provided with respective longitudinally through openings inside of which passing elements 102 are housed (schematically represented only in FIG. 1 as for example of known type) which allow the entry of the optical fibres and of the conductor of the pieces of optical cable into the submarine optical amplifier 99 for connecting them to the apparatus for optical amplification 5.

Exemplarily the central body 3 is cylindrical and the first 1 and the second end body 2 have spherical cap shape.

In one not shown embodiment, the first 1 and the second end body 2, in addition to a part with spherical cap shape, comprise a further cylindrical part at the coupling interface with the central body 3.

Exemplarily (as shown in FIGS. 1, 2a, 2b, 4 and 5) the second end body 2 is distinct from the central body 3. Exemplarily the first 1 and the second end body 2 are fixed to the central body 3, exemplarily by screws.

In FIG. 1 it is exemplarily shown (by the virtual dashed lines 400) a possible separation between the first 6' (and respectively the second 6") portion of the layer of electrically insulating material and a central portion 6 of the layer of electrically insulating material which covers the central body 3. The shown separation is purely schematic and has the sole purpose of greater explanation clarity since the portions 6, 6', 6" of the layer of insulating material 60 are defined on the basis of the different steps of the production process of the submarine optical amplifier 99 in which they are made, as will be better explained hereinafter with reference to FIGS. 2a-2b. At the end of the production process of the submarine optical amplifier 99 (i.e. on the finished object), the portions of the layer of electrically insulating material 6, 6', 6" are intimately joined without a real physical separation interface.

The portions 6', 6" of the layer of electrically insulating material 60, as will be better explained below with reference to FIGS. 2a-2b, homogeneously and continuously melt with the electrically insulating sheaths of the pieces of optical cable 200 at the passing elements 102, to ensure the electric insulation continuity in the passage between piece of optical cable 200 and submarine optical amplifier 99.

Exemplarily the vessel 50 is made of steel. The central body 3 and/or the end bodies can have a thickness with variable trend. Exemplary thickness values are 30 mm for at least a part of the central body 3 and 25 mm for at least a part of the first 1 and second end body 2.

Exemplarily the first 7 and the second thermally insulating element 8 entirely and with continuity cover an external surface of the first 1 and respectively of the second end body 2.

Exemplarily the first 7 and the second thermally insulating element 8 are made of poly-ether-ether-ketone (PEEK). In fact, the poly-ether-ether-ketone has a thermal conductivity equal to about 0.25 W/(m·K) which allows to achieve the desired thermal insulation. Furthermore, the poly-ether-ether-ketone has a melting temperature of about 343° C., preventing that the first 7 and the second thermally insulating element 8 undergo physical state changes during the making of the first 6' and respectively of the second portion 6" of layer of electrically insulating material 60.

In one alternative embodiment, the first and/or the second thermally insulating element are made of alumina (aluminium oxide) and/or zirconia (zirconium oxide).

Exemplarily the first 7 and the second thermally insulating element 8 have a, exemplarily constant, thickness equal to 5 mm.

The external surface of the set formed by the vessel 50 and by the first 7 and second thermally insulating element 8 (and possibly by the first 9 and second screen 10 as in the embodiment shown in FIG. 6) is regular. In other words, the layer of electrically insulating material 60 remains in contact, at the surface facing towards the housing cavity (i.e. its inner surface), with a surface as free as possible of jump discontinuities (e.g. abrupt depressions and/or ridges and/or overlaps).

Exemplarily the electrically insulating material is polyethylene (PE), preferably HDPE (due to its property of being extrudable for the purpose of the making of the covering sheaths of the pieces of submarine optical cables).

Exemplarily the layer of electrically insulating material 60 has a, exemplarily constant, thickness equal to 6 mm. The polyethylene (PE) has a thermal conductivity equal to about 0.4 W/(m·K) thus allowing to create a path with low thermal resistance at the central body 3, to favour the heat dissipation. Furthermore, the polyethylene (PE) has an electric resistivity equal to approximately 1015 Ω/m (measured at 23° C. and 50% RH, i.e. relative humidity) thus ensuring the desired electric insulation properties.

Figure 3:
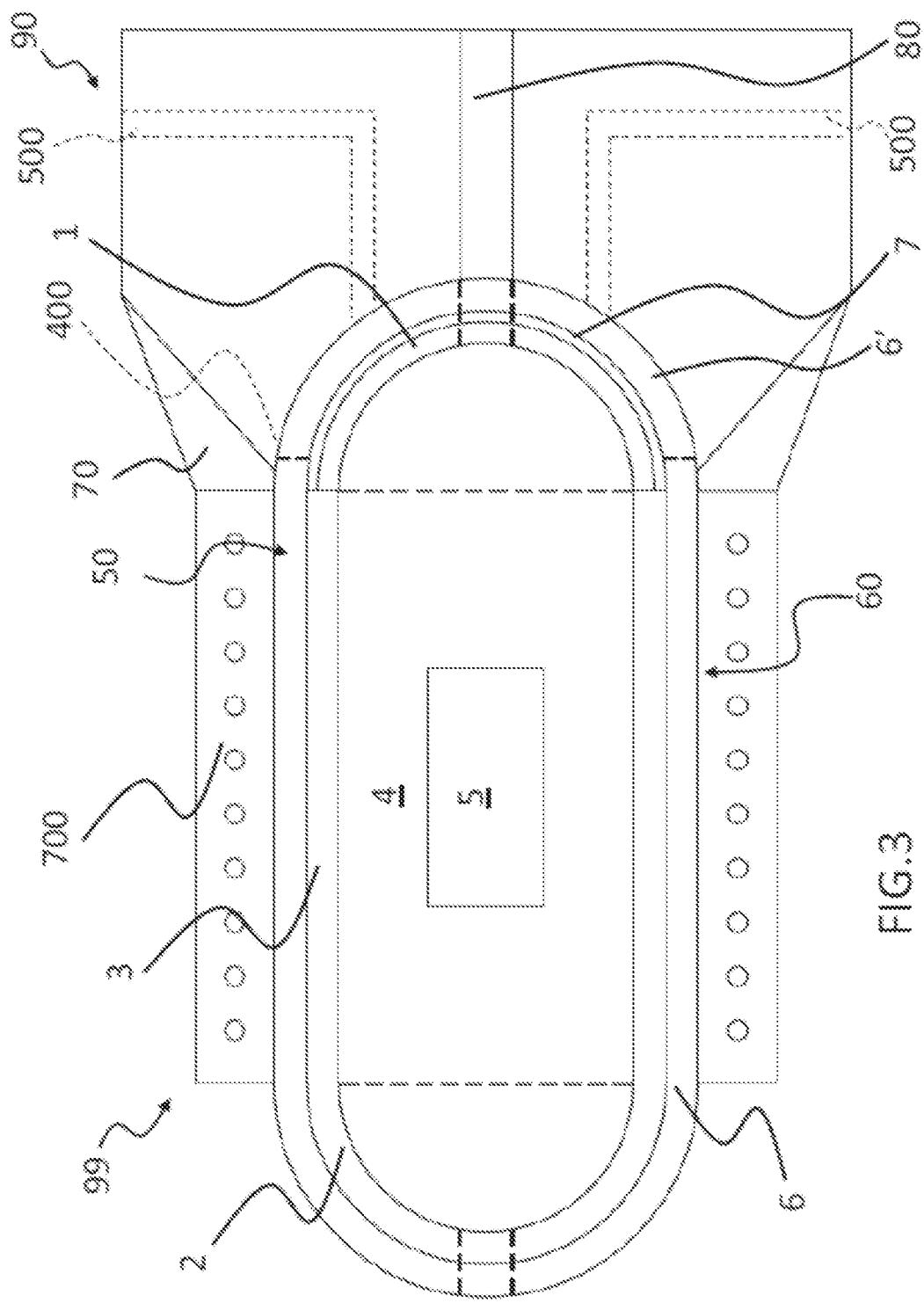
FIG. 3 schematically shows in section a step of a production process of a submarine optical amplifier according to a further embodiment of the present invention.

In one embodiment, as exemplarily shown in FIG. 3, the second end body 2 is in single piece with the central body 3 and the submarine optical amplifier 99 comprises only the first thermally insulating element 7.

Figure 4:
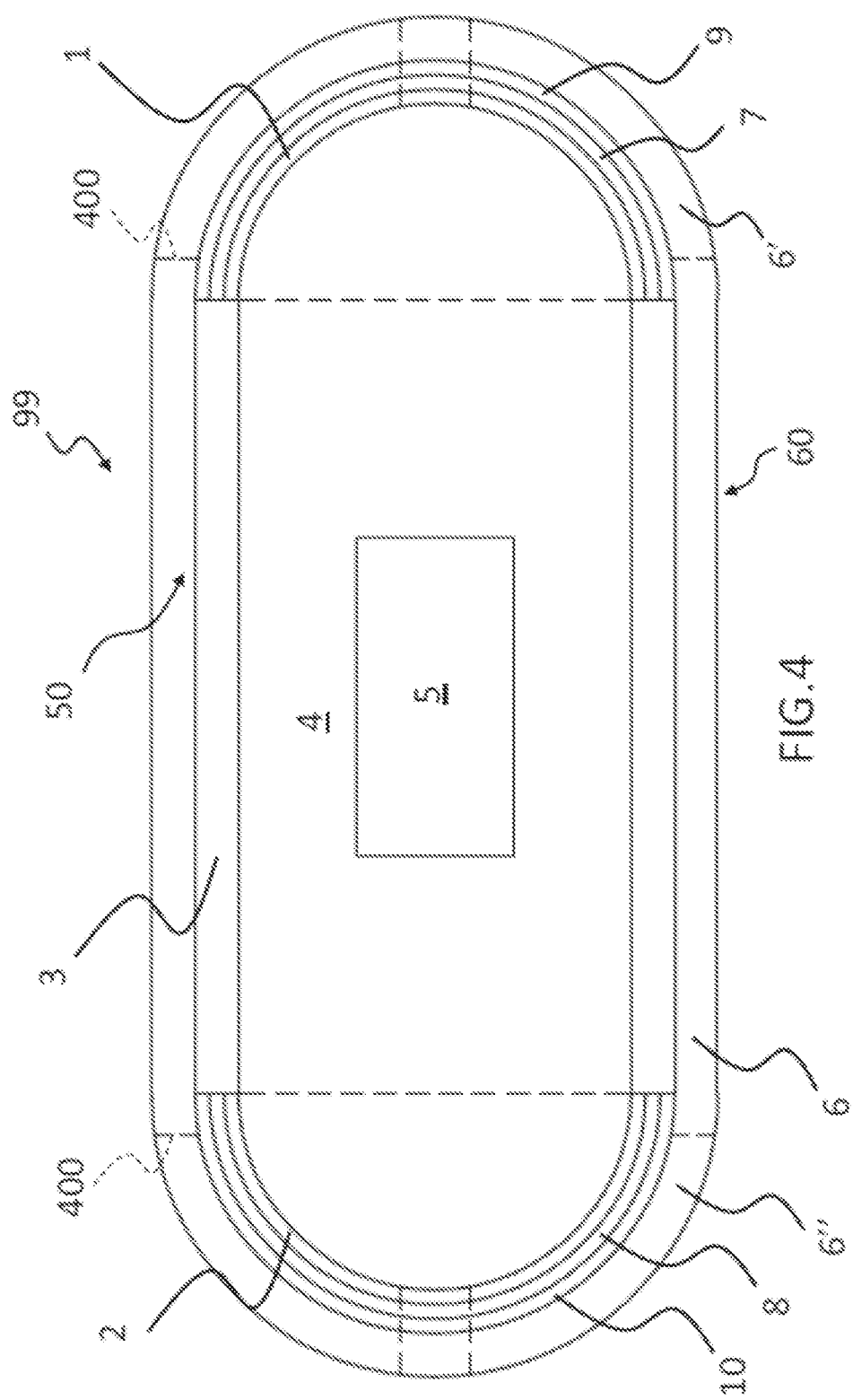
FIG. 4 schematically shows a sectional view of a submarine optical amplifier according to a further embodiment of the present invention.
Figure 5:
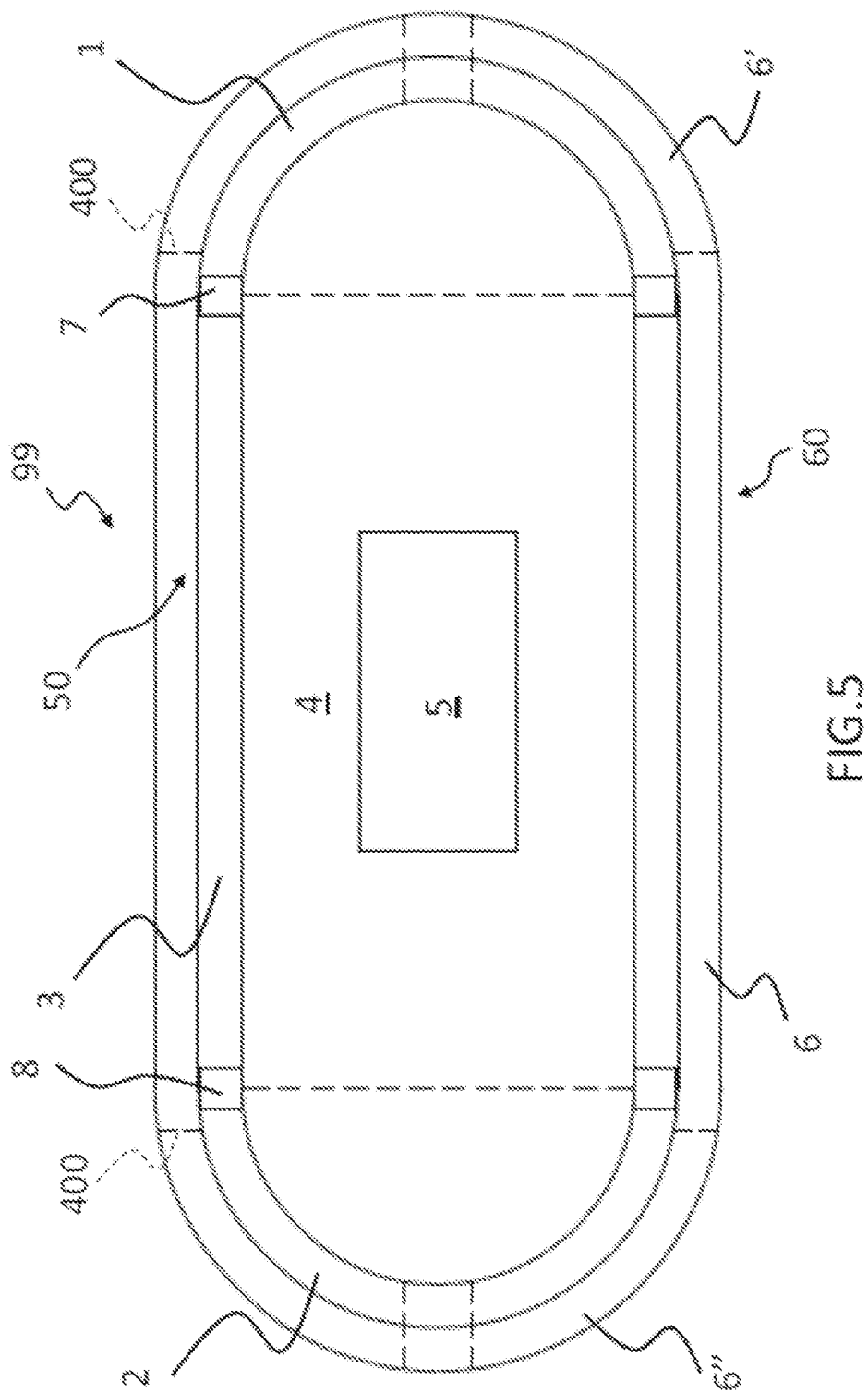
FIG. 5 schematically shows a sectional view of a submarine optical amplifier according to a still further embodiment of the present invention.

In one embodiment, as exemplarily shown in FIG. 4, the submarine optical amplifier 99 comprises an electrically conductive or semi-conductive first 9 and an electrically conductive or semi-conductive second screen 10, which externally, entirely and with continuity cover the first 7 and respectively the second thermally insulating element 8.

Exemplarily the first 9 and the second screen 10 are interposed, exemplarily in contact, respectively between the first portion 6' of the layer of electrically insulating material 60 and the first thermally insulating element 7 and between the second portion 6" of the layer of electrically insulating material 60 and the second thermally insulating element 8.

Exemplarily the first 9 and the second screen 10 have a thickness equal to 2 mm. Exemplarily the first 9 and the second screen 10 are made of steel.

In one exemplary embodiment, the first and the second screen are made of PEEK filled with a percentage (typically less than 10%) of conductive material, exemplarily as graphite and/or carbon fibres, so as to make the PEEK semiconductive.

In presence of the screens, exemplarily the first 7 and the second thermally insulating element 8 can be made of poly-tetra-fluor-ethylene (PTFE). In one embodiment, as exemplarily shown in FIG. 5, the first 7 and the second thermally insulating element 8 are a ring interposed between the central body 3 and the first 1 and respectively the second end body 2.

In this embodiment exemplarily the thickness of the first 7 and of the second thermally insulating element 8 is equal to the thickness of the central body 3.

Figure 2A:
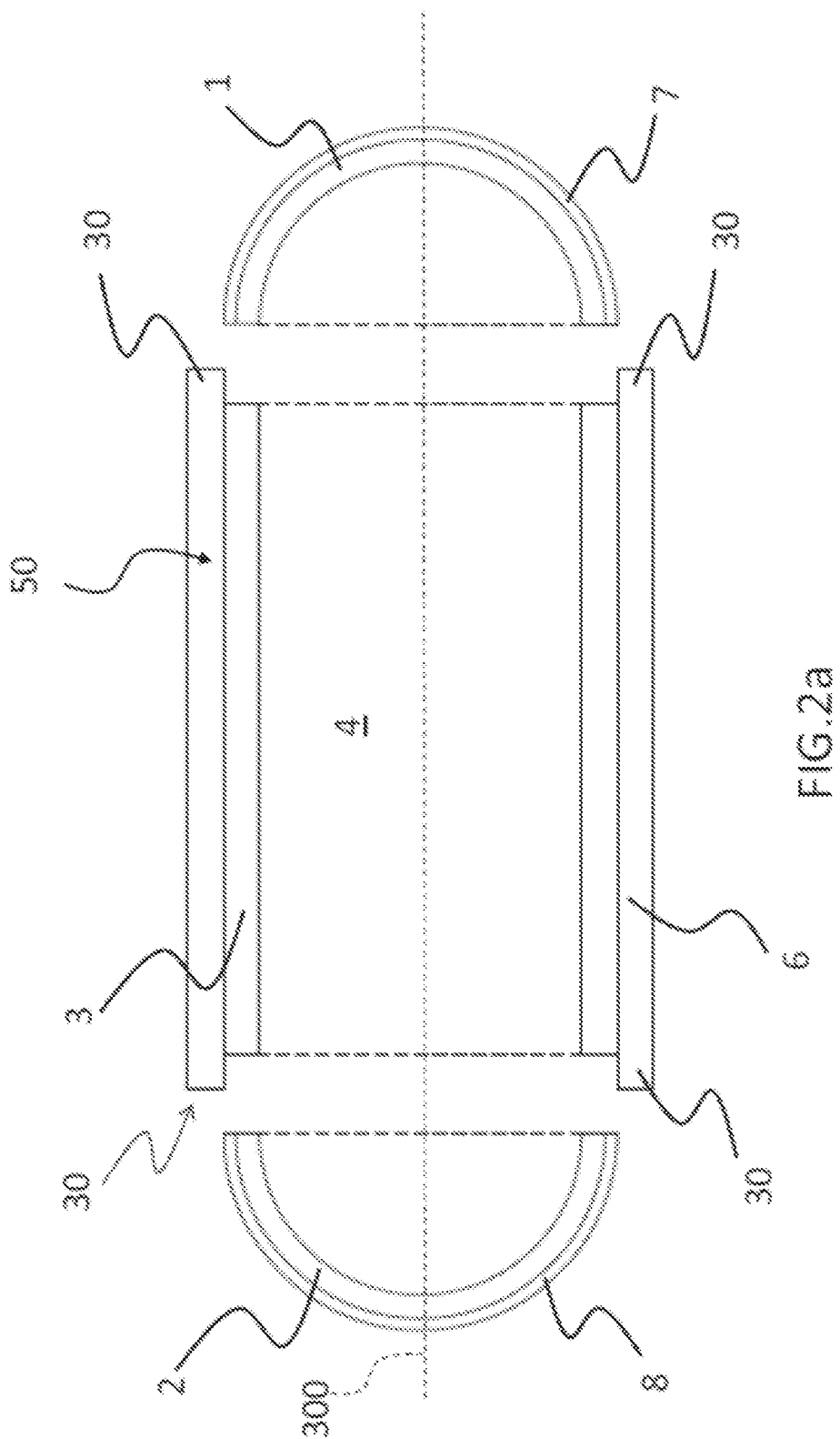
FIGS. 2a and 2b schematically show in section some steps of a production process of a submarine optical amplifier according to an embodiment of the present invention.
Figure 2B:
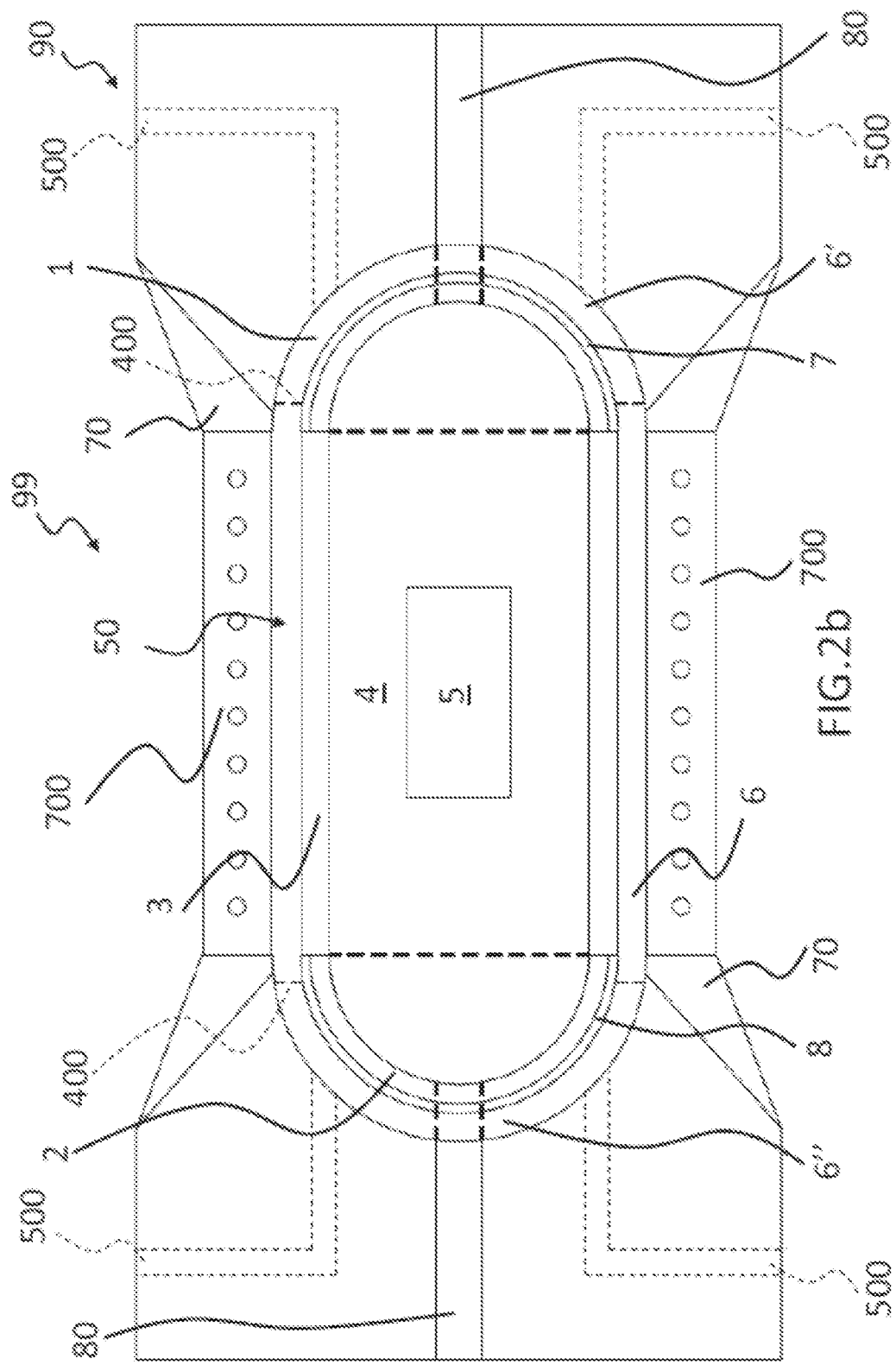

Referring to FIGS. 2a, 2b, the steps of an example of a production process of the submarine optical amplifier 99 described with reference to FIG. 1 are schematically shown.

Preferably the process comprises covering the central body 3 of the vessel 50 with an electrically insulating material to make the central portion 6 of layer of electrically insulating material 60.

Subsequently, the apparatus for optical amplification 5 is inserted into the housing cavity 4.

At this point the vessel 50 is assembled by fixing the first 1 and the second end body 2 to the central body 3 at respectively the first and second ends of the central body 3, for closing the housing cavity 4. Exemplarily the first 7 and the second thermally insulating element 8 have already been previously coupled (e.g. by glues and/or screws and/or snap-fit) to the first 1 and respectively to the second end body 2.

Subsequently, the first 1 and the second end body 2 are partially covered with the electrically insulating material, for making respectively the first 6' and the second portion 6" of the layer of electrically insulating material 60, which, together with the central portion 6, make the layer of electrically insulating material 60.

Exemplarily the first 1 and the second end body 2 are partially covered simultaneously.

In one alternative exemplary not shown embodiment, the second end body 2 is partially covered after the first end body 1.

Exemplarily covering the central body 3 is performed by a mould (not shown) maintained at a temperature greater than or equal to a melting temperature of the electrically insulating material ('hot mold'). According to the Applicant, the absence of the apparatus for optical amplification 5 inside the housing cavity 4 of the central body 3 allows covering the central body 3 without that the process requires any particular thermal constraints, with an increase of the simplicity and/or speed of the production process of the submarine optical amplifier.

In one alternative embodiment, the central portion 6 of the layer of electrically insulating material 60 is made by turning and subsequently hot applied (e.g. at a temperature of about 90-100° C.) on the central body 3 of the vessel 50.

Exemplarily partially covering the first 1 and the second end body 2 is performed by filling of a mould 90 (shown in FIG. 2b) exemplarily heated before the filling and kept at a temperature greater than or equal to the melting temperature of the electrically insulating material.

Exemplarily the filling of the mould 90 takes place in a time interval equal to 30 minutes.

In particular, during the making of the first 6' and of the second portion 6" of the layer of electrically insulating material, the electrically insulating material in the molten state is injected through typically one or more injection channels 500, exemplarily placed approximately in a barycentric position with respect to the volume of injected material. This allows a homogeneous filling of the cavity of the mould 90 for making the first 6' and the second portion 6" of the layer of electrically insulating material 60. However, the arrangement and the number of injection channels 500 are purely illustrative.

Furthermore, during the making of the first 6' and the second portion 6" of the layer of electrically insulating material 60, the pieces of optical cable 200 are typically inserted inside ducts 80 along which a longitudinal temperature gradient is created, i.e. from a temperature of about 70° C. to the melting temperature of the electrically insulating material going from the external environment towards the vessel 50. The created temperature gradient allows progressively melting the portion of the electrically insulating sheath of the piece of cable which is in more proximal position to the first 6' and to the second portion 6" of the layer of electrically insulating material 60 for making the junctions between the first 6' and the second portion 6" of the layer of electrically insulating material 60 with the electrically insulating sheath of the respective piece of cable. In this way the generation of residual stresses inside the material is avoided that would compromise the tightness of the electric insulation and the covering continuity at the coupling between the submarine optical amplifier and the piece of cable is ensured.

Exemplarily subsequently to the filling of the mould 90 it is provided letting cooling the electrically insulating material for an interval of about 90 minutes, for allowing the material to solidify and thus making the first 6' and the second 6" portion of the layer of electrically insulating material.

Exemplarily during the covering of the first 1 and the second end body 2, it is provided cooling (e.g. schematically represented by the cooler 700) the central body 3, exemplarily at an external surface of the central portion 6 of electrically insulating material.

Exemplarily the central portion 6 of the layer of electrically insulating material comprises a protruding portion 30 (shown only in FIG. 2a) which longitudinally protrudes from the central body 3 at the first and second ends of the central body 3. Exemplarily when the vessel is assembled the protruding portion 30 is placed externally to a part of the first 7 and of the second thermally insulating element 8. In other words, when the central body 3 of the vessel is covered, a portion that exceeds the longitudinal development of the central body at the ends of the central body 3 is created, for example through the use of removable inserts (not shown). These excess portions have substantially ring shape and when the vessel is assembled, they externally cover part of the thermally insulating element which is coupled to the respective end body.

Exemplarily covering the first 1 and the second end body 2 comprises melting together a respective end of the protruding portion 30 with a respective end of the first 6' and of the second portion 6" of the layer of electrically insulating material (e.g. the melting takes place near the virtual line 400).

At the protruding portion 30, the mould 90 has transition elements 70 which allow to have a temperature transition zone between the central portion 6 of the layer of electrically insulating material already made and the portions 6', 6" that are in making. These temperature transition zones avoid a sudden temperature variation in the junction area between the protruding portion and the first 6' and second portion 6" of the layer of electrically insulating material, to allow a regular and gradual heat passage that limits and/or avoids the formation of internal tensions in the electrically insulating material that is in moulding.

In one embodiment, in which the second end body 2 can be in single piece with the central body 3, as exemplarily shown in FIG. 3, or distinct from it, the second end body 2 is covered previously to the insertion of the apparatus for amplification 5 (and therefore to the assembly of the vessel 50), for example simultaneously with the covering of the central body 3 (e.g. with moulding or turning technique). Therefore, no thermally insulating element interposed between the central body and the portion of the layer of electrically insulating material that covers the second end body is necessary, being sufficient the first thermally insulating element 7 (e.g. in form of ring or covering).

In this embodiment it is advantageously possible positioning the components of the apparatus for optical amplification 5 which are more temperature sensitive (e.g. the lasers) inside the housing cavity 4 on the side of the second end body 2, while the power electronics (more resistant to high temperature) is positioned on the part of the housing cavity 4 facing the first end body 1, which is to be still covered with the electrically insulating material. In this way the most critical step of the covering process of the vessel (i.e. the moulding of the first portion 6') can be performed with lower risk of damaging the apparatus for optical amplification 5.

Furthermore, in this embodiment, the piece of optical cable that is coupled at the second end body must be inserted inside the suitable through opening obtained on the second end body before the second end body is covered. In this way it is possible amalgamating the electrically insulating sheath of the piece of cable which is at the second end body with the portion (which covers the second end body) of layer of electrically insulating material that is being made.

In one further, not shown, embodiment of the process the second end body 2 is distinct from the central body (as shown in FIG. 2*a* but without thermally insulating element) and it is coupled to the central body 3 and covered before inserting the apparatus for optical amplification 5 inside the housing cavity 4, to obtain the above described advantages as regards its insulating covering.

In one embodiment, in which the first 9 and the second screen 10 are present (FIG. 4), exemplarily it is provided coupling the first 9 and the second screen 10 to the first 7 and respectively to the second thermally insulating element 8 after having assembled the vessel 50 with the first 7 and the second thermally insulating element 8, coupled to the first 1 and to the second end body 2 respectively. Exemplarily coupling the first 9 and the second screen 10 is performed previously to partially covering the first 1 and the second end body 2.

Exemplarily it is provided coupling the first 9 and the second screen 10 at the first 1 and the second end body 2 by fixing means (e.g. screws, bolts) and/or adhesives.

The present invention also encompasses the (not shown) combination of some embodiments described and/or illustrated herein. For example, in a submarine optical amplifier in which the second end body 2 is devoid of the second thermally insulating element, the screen 9 may be present, which externally, entirely and with continuity covers the first thermally insulating element 7, or the first thermally insulating element 7 can have ring shape as the type shown in FIG. 5.

What is claimed is:

1. A production process of a submarine optical amplifier for optical telecommunication systems, wherein the submarine optical amplifier comprises:

a vessel, comprising a central body, having a housing cavity, and a first and a second end body, and a layer of electrically insulating material which externally, entirely and with continuity covers the vessel, wherein the process comprises:

covering in part the vessel with the electrically insulating material for making a part of the layer of electrically insulating material comprising at least a central portion of the layer of electrically insulating material which covers the central body;

subsequently to covering in part the vessel, inserting an apparatus for optical amplification at least partially in the housing cavity;

subsequently to inserting, assembling the vessel by fixing at least the first end body to the central body at a first end of the central body for closing the housing cavity, wherein at least a first thermally insulating element is coupled to the first end body;

subsequently to assembling, at least partially covering the first end body with the electrically insulating material for making a first portion of the layer of electrically insulating material, which forms, together with the part of the layer of electrically insulating material, the layer of electrically insulating material, and wherein the first thermally insulating element is interposed between the central body and the first portion of the layer of electrically insulating material.

2. The process according to claim 1, wherein at least partially covering the first end body comprises filling a mould with the electrically insulating material in molten state, wherein the mould is maintained at a temperature greater than or equal to a melting temperature of the electrically insulating material, wherein filling the mould occurs in a time interval greater than or equal to 10 minutes, wherein at least partially covering the first end body comprises, subsequently to filling the mould with the electrically insulating material, letting cooling the electrically insulating material for a time interval greater than or equal to 60 minutes.

3. The process according to claim 1, wherein the central portion of the layer of electrically insulating material comprises a protruding portion from the central body at least at the first end of the central body, wherein the protruding portion is, when the vessel is assembled, externally to at least a part of the first thermally insulating element, and wherein at least partially covering the first end body comprises melting together a respective end of the protruding portion and a respective end of the first portion of the layer of electrically insulating material.

4. The process according to claim 1, wherein the second end body is in single piece with the central body, and wherein covering in part the vessel comprises covering also the second end body with the electrically insulating material.

5. The process according to claim 1, wherein the second end body is separate from the central body,
wherein assembling the vessel comprises fixing the second end body to the central body at a second end of the central body, opposite to the first end, for closing the housing cavity, wherein a second thermally insulating element is coupled to the second end body, wherein the process comprises at least partially covering the second end body with the electrically insulating material, for making a second portion of the layer of electrically insulating material, which forms, together with the central portion of the layer of electrically insulating material and the first portion of the layer of electrically insulating material, the layer of electrically insulating material, wherein the second thermally insulating element is interposed between the central body and the second portion of the layer of electrically insulating material.

6. A submarine optical amplifier for optical telecommunication systems, wherein the submarine optical amplifier comprises:
a vessel comprising a central body, having a housing cavity, and a first and a second end body at respectively a first and a second end of the central body, opposite to each other, for closing the housing cavity;
an apparatus for optical amplification at least partially housed in the housing cavity;
a layer of electrically insulating material which externally, entirely and with continuity covers the vessel,
wherein the submarine optical amplifier comprises at least a first thermally insulating element interposed between the central body and a first portion of the layer of electrically insulating material which at least partially covers the first end body.

7. The amplifier according to claim 6, wherein the vessel is made of metal, wherein the first thermally insulating element is made of a material having a thermal conductivity less than or equal to 0.50 W/(m·K), wherein the first thermally insulating element is made of poly-aryl-ether-ketone (PAEK), wherein the first thermally insulating element has a thickness greater than or equal to 2 mm and less than or equal to 10 mm, wherein the first thermally insulating element is made of a material having a melting temperature greater than or equal to 250° C.

8. The amplifier according to claim 6, wherein the first thermally insulating element comprises a ring interposed between the central body and the first end body.

9. The amplifier according to claim 6, wherein the second end body is separate from the central body, wherein the submarine optical amplifier comprises a second thermally insulating element interposed between the central body and a second portion of the layer of electrically insulating material which at least partially covers the second end body, and wherein the submarine optical amplifier comprises an electrically conductive or semi-conductive first screen, which externally, entirely and with continuity covers the first thermally insulating element and interposed between the layer of electrically insulating material and the first thermally insulating element.

10. An optical communication line comprising:
an optical transmission cable;
at least one submarine optical amplifier according to claim 6 coupled to the optical transmission cable, and
at least two pieces of optical cable coupled on one side with the submarine optical amplifier, respectively at the first and the second end body, and on the other side with the optical transmission cable.

11. The amplifier according to claim 6, wherein the first thermally insulating element entirely and with continuity covers an external surface of the first end body.

12. The amplifier according to claim 9, wherein the second thermally insulating element is made of a material having a thermal conductivity less than or equal to 0.50 W/(m·K), wherein the second thermally insulating element is made of poly-aryl-ether-ketone (PAEK), wherein the second thermally insulating element has a thickness greater than or equal to 2 mm and less than or equal to 10 mm, wherein the second thermally insulating element is made of a material having a melting temperature greater than or equal to 250° C.

* * * * *